(12) United States Patent
Hsu et al.

(10) Patent No.: US 11,079,496 B2
(45) Date of Patent: Aug. 3, 2021

(54) PRECISE POINT POSITIONING METHOD AND POSITIONING APPARATUS AND RECORDING MEDIUM THEREOF

(71) Applicant: Industrial Technology Research Institute, Hsinchu (TW)

(72) Inventors: Yi-Huai Hsu, Taoyuan (TW); Ying-Yu Chen, Hsinchu County (TW); Hao-Yu Wang, Tainan (TW); Jyh-Ching Juang, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 184 days.

(21) Appl. No.: 16/232,093

(22) Filed: Dec. 26, 2018

(65) Prior Publication Data

US 2020/0064493 A1 Feb. 27, 2020

Related U.S. Application Data

(60) Provisional application No. 62/722,997, filed on Aug. 27, 2018.

(51) Int. Cl.
*G01S 19/43* (2010.01)
*G01S 19/04* (2010.01)
(Continued)

(52) U.S. Cl.
CPC .............. *G01S 19/43* (2013.01); *G01S 19/04* (2013.01); *G01S 19/07* (2013.01); *G01S 19/13* (2013.01); *G01S 19/40* (2013.01)

(58) Field of Classification Search
CPC ........ G01S 19/43; G01S 19/07; G01S 19/072; G01S 19/04; G01S 19/40
See application file for complete search history.

(56) References Cited

U.S. PATENT DOCUMENTS

| 9,910,158 B2 | 3/2018 | Rudow et al. |
| 2005/0024263 A1* | 2/2005 | Sharpe ............... G01S 19/072 342/357.31 |

(Continued)

FOREIGN PATENT DOCUMENTS

| CN | 102096084 | 6/2011 |
| CN | 102426372 | 4/2012 |

(Continued)

OTHER PUBLICATIONS

Wasle et. al, "GNSS—Global Navigation Satellite Systems", 2008 Springer-Verlag Wien (Year: 2008).*

(Continued)

*Primary Examiner* — Erin F Heard
*Assistant Examiner* — Thomas M Hammond, III
(74) *Attorney, Agent, or Firm* — JCIPRNET

(57) ABSTRACT

Precise point positioning (PPP) method and a PPP device are provided. The precise point positioning method includes obtaining a first satellite signal of a target satellite and a second satellite signal of a reference satellite. The first satellite signal and the second satellite signal are combined to eliminate a signal error and obtain a combined satellite signal. A smoothing process is performed on a code data of the combined satellite signal, to obtain a satellite positioning data for positioning process. The satellite positioning data includes modified code data and modified carrier-phase data.

18 Claims, 4 Drawing Sheets

(51) Int. Cl.
*G01S 19/07* (2010.01)
*G01S 19/13* (2010.01)
*G01S 19/40* (2010.01)

(56) References Cited

U.S. PATENT DOCUMENTS

| | | | |
|---|---|---|---|
| 2010/0188285 | A1 | 7/2010 | Collins |
| 2012/0050097 | A1* | 3/2012 | Zhang .................. G01S 19/423 342/357.26 |
| 2012/0176271 | A1 | 7/2012 | Dai et al. |
| 2014/0070992 | A1* | 3/2014 | Hernandez-Pajares ..................... G01S 19/02 342/357.395 |
| 2015/0309177 | A1 | 10/2015 | Wallace et al. |
| 2018/0067214 | A1 | 3/2018 | Niesen et al. |
| 2018/0252819 | A1* | 9/2018 | Gao .................. G01S 19/44 |
| 2019/0120973 | A1* | 4/2019 | Martin .................. G01S 19/256 |
| 2019/0324153 | A1* | 10/2019 | Chen .................. G01S 19/44 |
| 2020/0257002 | A1* | 8/2020 | Henkel .................. G01S 19/04 |

FOREIGN PATENT DOCUMENTS

| | | |
|---|---|---|
| CN | 103064097 | 4/2013 |
| CN | 103344978 | 10/2013 |
| CN | 104459737 | 3/2015 |
| CN | 105807300 | 7/2016 |
| CN | 107329147 | 11/2017 |
| CN | 105122083 | 5/2018 |
| CN | 108363079 | 8/2018 |
| TW | I533011 | 5/2016 |

OTHER PUBLICATIONS

Subirana et. al, "Carrier-smoothing of code pseudoranges" (exerpt), 2011 Navipedia (Year: 2011).*
Wang et al., "An Improved Weight Stochastic Model in GPS Precise Point Positioning", 2011 International Conference on Transportation, Mechanical, and Electrical Engineering (TMEE), Dec. 16-18, 2011 (Year: 2011).*
Gao et al., "Kinematic Precise Point Positioning Using Multi-Constellation Global Navigation Satellite System (GNSS) Observations", International Journal of Geo-Information MDPI, Jan. 5, 2017 (Year: 2017).*
Park Byungwoon et al., "Optimal Hatch Filter With a Flexible Smoothing Window Width", Proceedings of the 18th International Technical Meeting of the Satellite Division, Sep. 13-16, 2005, pp. 592-602.
Zhenggang Huang et al., "A New Optimal Hatch Filter to Minimize the Effects of Ionosphere Gradients for GBAS", Chinese Journal of Aeronautics, Dec. 1, 2008, pp. 526-532.
"Search Report of Europe Counterpart Application", dated Feb. 7, 2020, pp. 1-8.
Mohamed Elsobeiey, "Precise Point Positioning using Triple-Frequency GPS Measurements", The Journal of Navigation, Nov. 25, 2014, pp. 480-492.
Hans Van Der Marel et al., "Single- versus Dual-Frequency Precise Point Positioning", InsideGNSS, Jul. 5, 2012, pp. 30-35.
Yang Gao et al., Abstract of "A New Method for Carrier-Phase-Based Precise Point Positioning", Navigation, Journal of the Institute of Navigation, Aug. 2002, pp. 1.
Mohamed Elsobeiey et al., "Efficient Between-Satellite Single-Difference Precise Point Positioning Model", Journal of Surveying Engineering, May 2014, pp. 1-7.
Xidong Yu et al., "Kinematic Precise Point Positioning Using Multi-Constellation Global Navigation Satellite System (GNSS) Observations", International Journal of Geo-Information, Jan. 5, 2017, pp. 1-15.
"Office Action of Taiwan Counterpart Application", dated Jun. 26, 2019, pp. 1-12.
Mohamed Elsobeiey et al., "Efficient Between-Satellite Single-Difference Precise Point Positioning Model", Journal of Surveying Engineering vol. 140, Issue 2, May 31, 2014, pp. 04014007-1-04014007-7.
Liu Guanjun et al., "Optimal Smoothing of GNSS Pseudo-Range by Carrier Phase", Journal of Spacecraft TT&C Technology vol. 34 No. 2, Apr. 30, 2015, pp. 162-167.
Byungwoon Park et al., "Optimal Hatch Filter with an Adaptive Smoothing Window Width", The Journal of Navigation vol. 61, Jul. 31, 2008, pp. 435-454.
Xiao Zhang et al., "Optimal Hatch Filter with an Adaptive Smoothing Time Based on SBAS", International Conference on on Soft Computing in Information Communication Technology, Jun. 1, 2014, pp. 34-37.
Huang Zhenggang., "A New Hatch Filter to Mitigate the Effect of Ionosphere Gradient for GBAS", Computer & Digital Engineering vol. 40 No. 7, Jul. 31, 2017, pp. 1-3.
"Office Action of China Counterpart Application", dated May 7, 2021, p. 1-p. 12.

* cited by examiner

PRECISE POINT POSITIONING METHOD AND POSITIONING APPARATUS AND RECORDING MEDIUM THEREOF

CROSS-REFERENCE TO RELATED APPLICATION

This application claims the priority benefit of U.S. provisional application Ser. No. 62/722,997, filed on Aug. 27, 2018. The entirety of the above-mentioned patent application is hereby incorporated by reference herein and made a part of this specification.

BACKGROUND

Technical Field

The disclosure is related to satellite positioning technology, and particularly to precise point positioning (PPP) method and positioning apparatus and recording medium thereof.

Description of Related Art

As the development in electronic information, the map information is presented as an electronic information. Associating with other technologies, comprising the technology of satellite positioning system (SPS), it has been very common that the location of a positioning device is positioned to the electronic map. In the practical applications, when a user carries a user equipment (UE), which is mobile such as mobile phone or positioning equipment, the positioning function is usually implemented, so to show the user's location on the map. There are many ways of positioning, in which satellite positioning is one of the ways.

SUMMARY

The disclosure provides a precise point positioning (PPP) technology, and may at least speed up the time for converging at the initial stage.

In an exemplary embodiment, the disclosure provides a precise point positioning method, performed by a user equipment, comprising obtaining a first satellite signal of a target satellite and a second satellite signal of a reference satellite. The first satellite signal and the second satellite signal are combined to eliminate a signal error and obtain a combined satellite signal. A smoothing process is performed on a code data of the combined satellite signal, to obtain a satellite positioning data for positioning process. The satellite positioning data comprises modified code data and modified carrier-phase data.

In an exemplary embodiment, the disclosure provides a precise point positioning apparatus, comprising a processor and a register, configured to perform operations. The operation comprises obtaining a first satellite signal of a target satellite and a second satellite signal of a reference satellite. The first satellite signal and the second satellite signal are combined to eliminate a signal error and obtain a combined satellite signal. A smoothing process is performed on a code data of the combined satellite signal, to obtain a satellite positioning data for a positioning process, the satellite positioning data comprises a modified code data and a modified carrier-phase data.

In an exemplary embodiment, the disclosure provides a precise point positioning method, performed by a user equipment. The method comprises receiving a satellite signal of a target satellite once at every one interval, the satellite signal having been processed by an error correction, wherein a current receiving stage is at a $n^{th}$ time, n is positive integer, wherein satellite positioning signal comprises a code data and a carrier-phase data. A smoothing process is performed on the code data at the $n^{th}$ time to obtain a smoothed code data at the $n^{th}$ time. The smoothing process is recursively performed at the $n^{th}$ time, comprising taking the code data at the $n^{th}$ time as a first term, taking a summation of a smoothed code data at the $(n-1)^{th}$ time, a carrier-phase data at the $n^{th}$ time and a carrier-phase data at the $(n-1)^{th}$ time as a second term, summing the first term and the second term respectively with weights by a parameter a' and a parameter (1−a'), and obtaining the code data at the $n^{th}$ time as recursively smoothed. The parameter a' comprises a satellite elevation angle of a satellite with respect to the user equipment, the parameter a' decreases as the satellite elevation angle increases.

In an exemplary embodiment, the disclosure provides a recording medium, recording a program code. The program code is obtained by a processor of a user equipment to perform the foregoing precise point positioning method.

To make the aforementioned more comprehensible, several embodiments accompanied with drawings are described in detail as follows.

DESCRIPTION OF THE EMBODIMENTS

The disclosure is directed to a precise point positioning technology used in a satellite positioning system. The disclosure provides the precise point positioning technology, capable of at least reducing the converge time.

Multiple exemplary embodiments are provided to describe the disclosure, but the disclosure is not limited to the exemplary embodiments.

When position of the user equipment is required on the ground, the user equipment receives the radio signal transmitted from the satellite. The radio signal provides the coordinate information of the satellite. Usually, according to the signals from four satellites at different locations, the location of the user equipment may be obtained. The satellite positioning system, for example, includes global positioning system (GPS), global navigation satellite system (GNSS), and further examples such as Beidou navigation satellite system (BDS), Galileo in European system, Globalnaya navigatsionnaya sputnikovaya Sistema (GLONASS) in Russian system, and so on.

In the positioning mechanism of satellite positioning system, the precise point positioning (PPP) technology in recent years has been widely used and researched with the property that the base-line distance between the mobile station and the reference station in the real time kinematic (RTK) technology is not limited and it can provide the user with positioning accuracy ranging from tens of centimeters to several centimeters.

The performance of precise point positioning (PPP) is relating to its converging time. It has an issue to be considered that the initial converging time for the precise point positioning is rather long, such as 20 to 40 minutes or even more.

Figure 1:
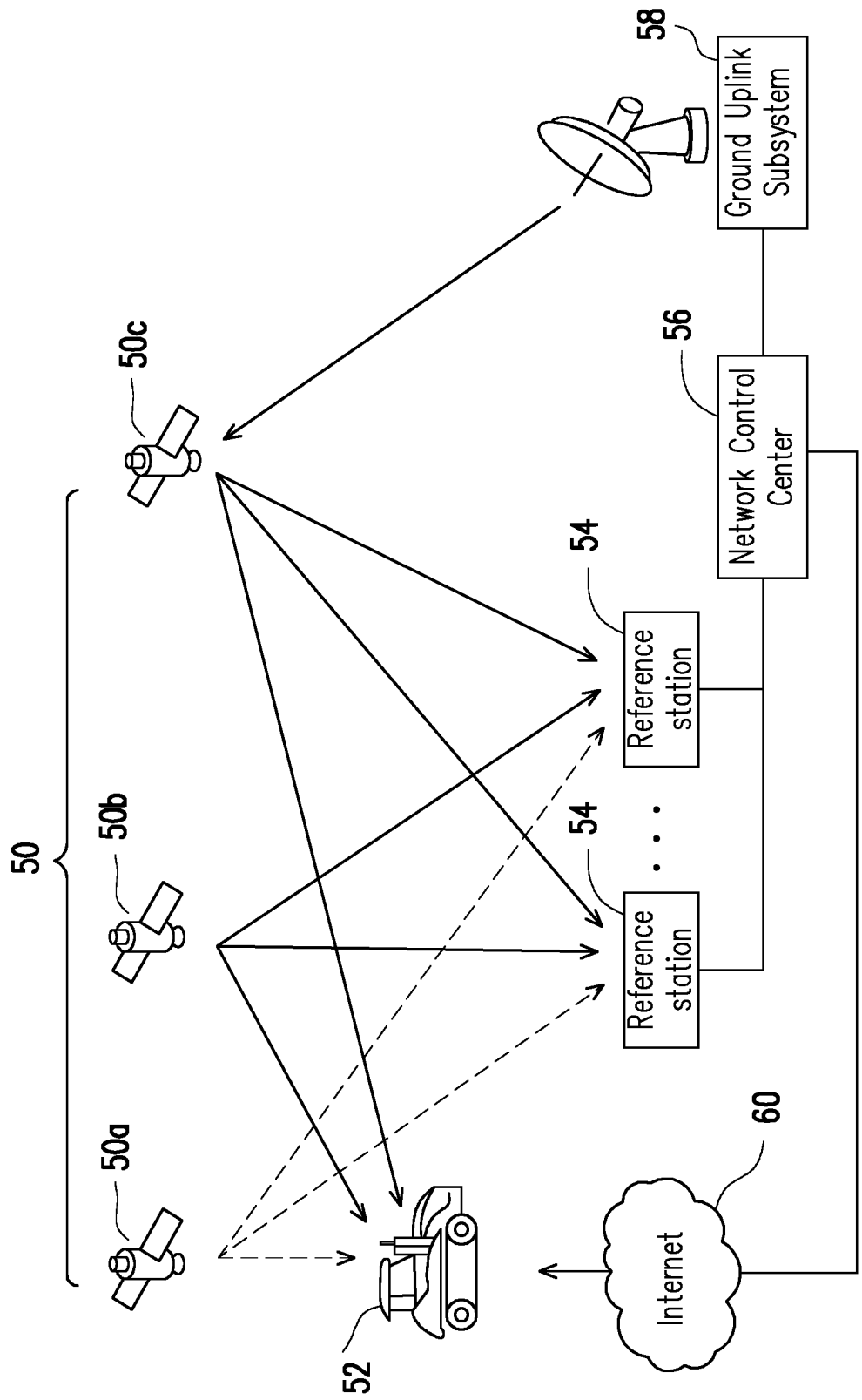
FIG. 1 is a drawing, schematically illustrating a positioning mechanism of a satellite positioning system, according to an exemplary embodiment of disclosure.

FIG. 1 is a drawing, schematically illustrating a positioning mechanism of a satellite positioning system, according to an exemplary embodiment of disclosure. Referring to FIG. 1, the satellite positioning system includes a satellite group 50 formed from several satellites 501, 50b, 50c. In an exemplary embodiment, it includes three satellites as an example. These satellites may be same type or different type, such as the satellites of Global Navigation Satellite System (GLONASS) or Global Positioning System (GPS), and so on.

The user equipment 52 having the receiver of satellite positioning system is implemented in a vehicle as an example, its location may be moved as needed. The receiving terminal of the satellite positioning system may further include the reference station 54 which is set up at a fixed location. The number of the reference station 54 is not limited to one and may be plural as needed.

Each satellite 50a, 50b. 50c of the satellite group 50 may respectively transmit the information about its current location of satellite to the reference station 54 and the user equipment 52. The user equipment 52 directly receives the signal, which is original as a first signal. The reference stations 54 set up at the fixed location also receive the signal transmitted by the satellite. The signal as received by the reference stations 54 is firstly processed to obtain general error correction data which is referred as a second signal. In an exemplary embodiment, the error correction data is a preliminary error correction data. The reference station 54 would transmit the second signal to the user equipment 52 through a network control center 56 and internet 60, so that the user equipment 52 may obtain the second signal. The user equipment 52 corrects the first signal according to the second signal to obtain a satellite signal corresponding to its working frequency. The satellite signal at different working frequencies may be provided by the same satellite with multi-frequency function or provided by different satellites, in which it usually is provided by the same satellite.

Further in accordance with the actual need, the user equipment 52 may obtain the second signal without through the internet 60. For example, the network control center 56 may transmit the second signal to a ground uplink system 58, which again transmits to the satellite 50c and then transmits to the user equipment 52.

The satellite signal in receiving is involving various errors, such as satellite clock error, receiver clock error, satellite orbital error, ionospheric error, tropospheric error, noise, and so on. The second signal which is generated by the reference station 54 may provide the general error correction, such as the satellite orbital error and the satellite clock error.

As to the satellite with multiple frequency channels, the satellite in the satellite positioning system uses at least one carrier-frequency signal. The user equipment, during the positioning operation, would receive a carrier-frequency signal from the satellite. To eliminate the effect due to the ionospheric layer, another carrier-frequency signal may be additionally obtained. After combining the multiple carrier-frequency signals, the effect due to ionospheric error may be eliminated. This another carrier-frequency signal may be provided by the same satellite with multiple frequency channels or provided by different satellites.

In an embodiment, the precise point positioning apparatus is implemented or disposed in the equipment 52. In an exemplary embodiment, the user equipment 52 is mobile, such as vehicle, train, boat, airplane, or drone, which may move quickly or enter a tunnel sometimes and then quickly get out the tunnel for receiving the satellite signal again.

Figure 2:
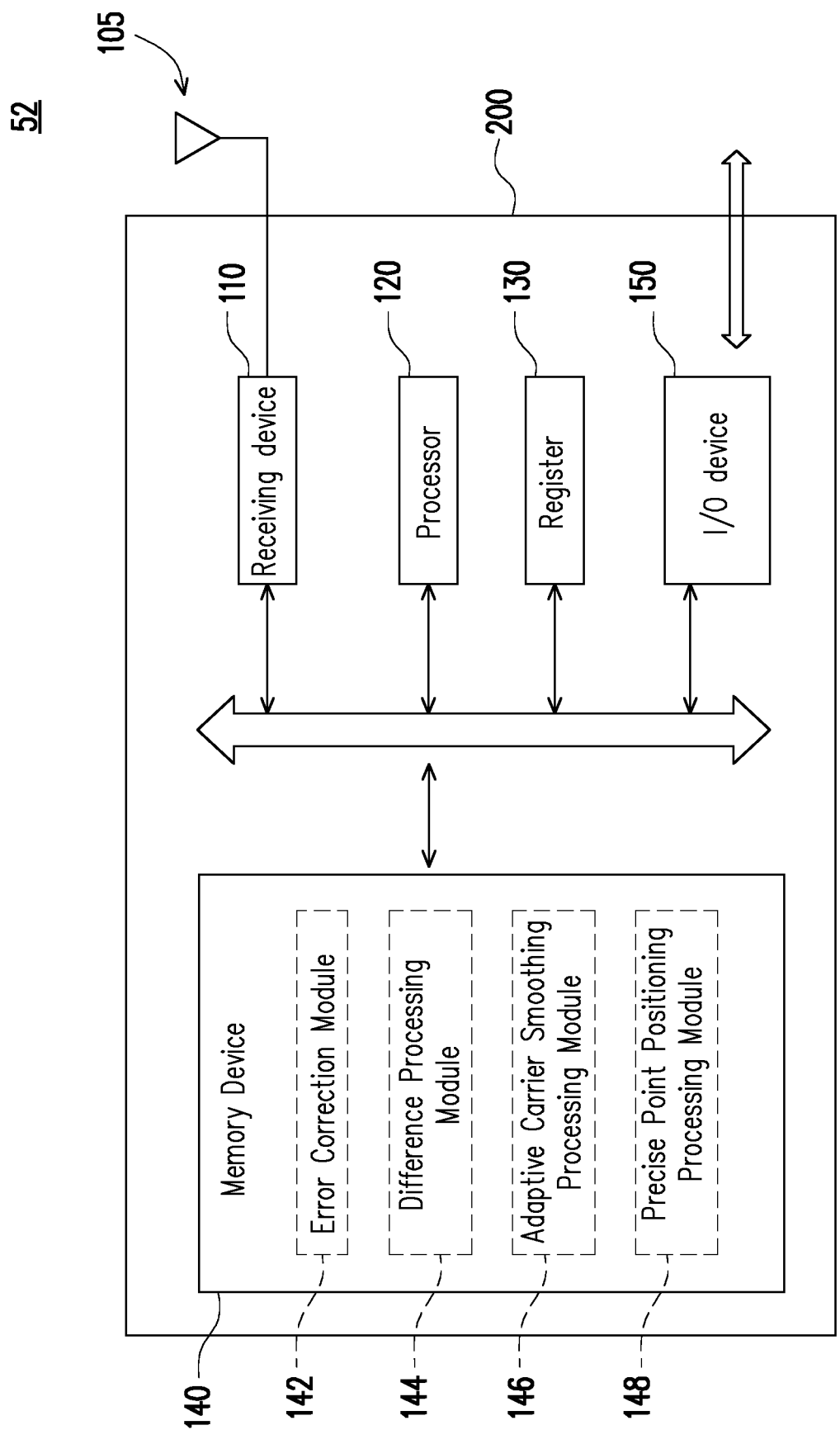
FIG. 2 is a drawing, schematically illustrating a structure of a precise point positioning apparatus, according to an exemplary embodiment of disclosure.
Figure 3:
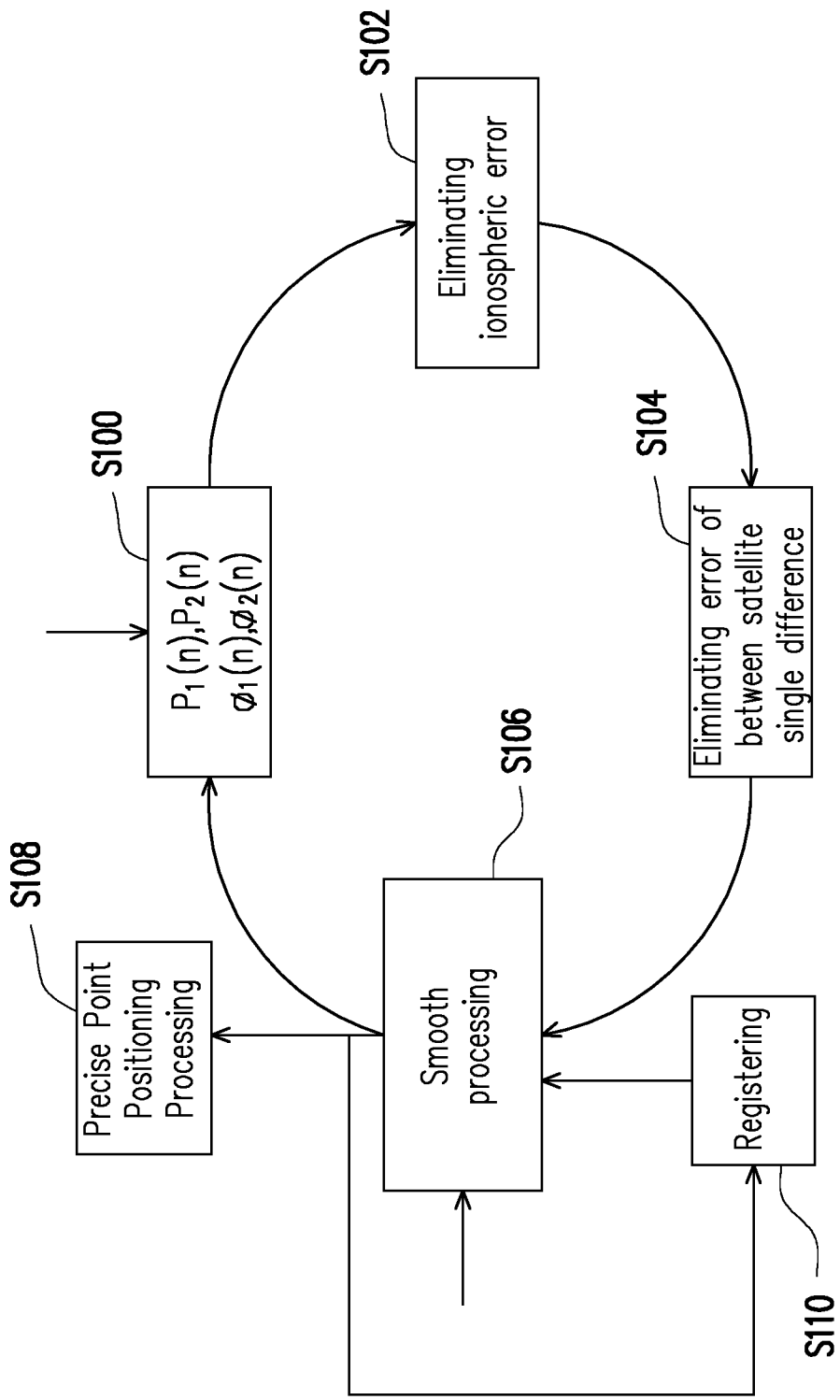
FIG. 3 is a drawing, schematically illustrating a precise point positioning method, according to an exemplary embodiment of disclosure.

FIG. 2 is a drawing, schematically illustrating a structure of a precise point positioning apparatus, according to an exemplary embodiment of disclosure. FIG. 3 is a drawing, schematically illustrating a precise point positioning method, according to an exemplary embodiment of disclosure.

The foregoing user equipment 52, in one of exemplary embodiments, may include the structure of a precise point positioning apparatus 200 or the constitution as shown in FIG. 2. Referring to FIG. 2, the precise point positioning apparatus 200 at least includes a receiving device 110, a processor 120, a register 130, a memory device 140, and an input/output (I/O) device 150. In another exemplary embodiment, the precise point positioning apparatus 200 may further includes an antenna 105. The precise point positioning apparatus 200 may eliminate various errors of the received signal based on a between satellite single difference (BSSD) technology. The various errors, for example, are the receiver clock error, receiver hardware delay, and initial phase error. In addition, the precise point positioning apparatus 200 may further apply an adaptive carrier smoothing technology to reduce the noise level for the code data after the BSSD processing. The signal after processing is then further used in the precise point positioning processing. The structure as a whole is described as follows.

The precise point positioning apparatus 200 in an example is the navigation device as used in a mobile phone or transporting tool (vehicle, train, boat, airplane, drone, and so on).

The receiving device 110 is used to communicate with the different communication system by the wireless way and receives the radio signal from satellite. The radio signal provides the information related to the location of the corresponding satellite. In an exemplary embodiment, the position and/or speed of the user equipment may be obtained according to the signals from multiple satellites, such as three satellites, at different locations. The communication system, for example, is satellite positioning system, including global positioning system (GPS), global navigation satellite system (GNSS), and further examples such as Beidou navigation satellite system (BDS), Galileo in European system, Globalnaya navigatsionnaya sputnikovaya Sistema (GLONASS) in Russian system, and so on.

The processor 120, for example, may be a central processing unit (CPU), microcontroller, application specific integrated circuit (ASIC), programmable logic device (PLD) as specifically programmed, or field programmable gate array (FPGA).

The register 130 is used to store the information temporarily needed during the operation of the processor 120, such as a cache memory and so on.

The memory device 140 is used to store various functional modules, which are executed by the processor 120. In an exemplary embodiment, it includes, for example, an error correction module 142, a difference processing module 144 for executing the BSSD process, an adaptive carrier smoothing processing module 146, and a precise point positioning (PPP) processing module 148. The memory device 140 may be a volatile memory, such as random access memory (RAM), read-only memory (ROM). The memory device 140 may also be non-volatile memory, such as hard disk, flash memory, or solid state storage.

The input/output device 150 is used to output or input data. The processor 120 of the precise point positioning apparatus 200 eliminates various errors of the received signal based on the BSSD technology, and may apply an adaptive carrier smoothing technology to reduce the noise level of the BSSD processed code data. The processed signal is further performed with the PPP operation, and then output by the I/O device 150. In an exemplary embodiment, a positioning system may show the current location of a user on a map as shown on a display (not shown).

Referring to FIG. 3, FIG. 3 is a drawing, schematically illustrating a precise point positioning method, according to an exemplary embodiment of disclosure. In an exemplary embodiment, it may perform the PPP method shown in FIG. 3 based on the PPP apparatus 200 shown in FIG. 2.

In an exemplary embodiment, the PPP operation may include processing a program code. The program code as needed is recorded in a recording medium. The recording medium may be the memory device 140 as internally implemented or an external recording medium, which is capable of being read by the PPP apparatus 200 of the user equipment. In an exemplary embodiment, the error correction module 142, the difference processing module 144, the adaptive carrier smoothing processing module 146 and the PPP processing module 148 may be a hardware, a firmware, or a software or a machine executable program code, which is recorded in the memory device 140 and is capable of being loaded by the processor 120 to execute.

In step S100, the receiving device 110 serves as a reception to receive the code data and the carrier-phase data. In step S102, the error correction module 142 performs the correction of the ionospheric error. In an exemplary embodiment, after the operation is activated, data would be received and processed once every one preset interval, in which the time point n is used to indicate the $n^{th}$ time for obtaining the data. In an exemplary embodiment, the operation is recursively and continuously performed. To the accumulation of time, the $n^{th}$ time represents the time point after n intervals, n is a positive integer. The initial time is n=1 as an example, n=1 represents the first time to receive the satellite signal, in which the raw satellite signal respectively belonging to each satellite is sequentially received. In an exemplary embodiment, the subsequent smoothing process of the signals is performed by a recursive manner. The data at the previous time point would be referred. Thus, the obtained satellite positioning data at the time of n=1 is not performed with the smoothing process yet but may be provided in use of the smoothing processing at the time point n=2 for the recursive operation.

In step S100, the receiving device 110 receives an original first frequency signal. Correcting the original first frequency signal with the preliminary error correction data to obtain a first frequency satellite signal. The first frequency satellite signal includes a code measurement data and the carrier-phase measurement data. The code measurement data is also briefly referred as a code data, indicated by $P_1(n)$ or $P_1$. The carrier-phase measurement data is also briefly referred as a carrier-phase data indicated by $\Phi_1(n)$ or $\Phi_1$. The subscript 1 represents the first frequency satellite signal. In an exemplary embodiment, the receiving device 110 receives the original second frequency signal. Correcting the original second frequency signal with the preliminary error correction data to obtain the second frequency satellite signal. The second frequency satellite signal may be used to eliminate the ionospheric error. The second frequency satellite signal includes the code data $P_2(n)$ and the carrier-phase data $\Phi_2(n)$, the subscript 2 represents the second frequency satellite signal. In an exemplary embodiment, the second frequency satellite signal may be transmitted from the same satellite which has transmitted the first frequency satellite signal at the different frequency channel. In another exemplary embodiment, the second frequency satellite signal may be transmitted by the satellite different from the satellite transmitting the first frequency satellite signal. In an exemplary embodiment, the first frequency satellite signal ($P_1$, $\Phi_1$ and the second frequency satellite signal ($P_2$, $\Phi_2$) are the signals having been corrected with the satellite orbital error and the satellite clock error.

In step S102, the error correction module 142 performs the operation to eliminate ionospheric error according to the combination of the first frequency satellite signal ($P_1$, $\Phi_1$ and the second frequency satellite signal ($P_2$, $\Phi_2$, so to obtain the ionosphere-free satellite signal, which is then indicated by the subscript 3, including the code data $P_3$ and the carrier-phase data $\Phi_3$, as shown in eq. (1):

$$P_3 = \rho + cdt_{P3}^r + T + \varepsilon_{P3}$$

$$\Phi_3 = \rho + cdt_{P3}^r + T + \lambda N' + \varepsilon_{\Phi 3} \quad (1)$$

P3: indicator corresponding to ionosphere-free code data,
Φ3: indicator corresponding to ionosphere-free carrier-phase data,
ρ: geometric distance between the receiver and satellite,
c: speed of light,
r: indicator corresponding to receiver,
$dt^r$: receiver clock error,
T: ionospheric delay,
ε: unmodeled error, such as thermal noise, multipath effect and so on,
N': carrier ambiguity of ionosphere-free combination,
λ: wavelength.

In an exemplary embodiment, the linear combination of the first frequency satellite signal ($P_1$, $\Phi_1$ and the second frequency satellite signal ($P_2$, $\Phi_2$) may eliminate the ionospheric error to obtain the code data $P_3$ and the carrier-phase data $\Phi_3$.

In an exemplary embodiment, the converging time in the PPP technology may be long. The reason is that the noise energy may be also amplified at the same time although the ionospheric error is eliminated by ionosphere-free linear combination in dual-frequency.

The step S104 is performed after the step S102, in which the difference processing module 144 performs the BSSD mechanism, so as to eliminate the errors relating to the receiver. In an exemplary embodiment, the receiver, for example, may be the PPP apparatus 200 in FIG. 2. In an exemplary embodiment, the errors relating to the receiver includes the receiver clock error, receiver hardware delay, and initial phase error. In an exemplary embodiment, the BSSD process may slightly amplify noise level of the measurement data. In an exemplary embodiment, the adaptive carrier smoothing processing module 146 may be used to perform the step S106 for performing the smoothing process, which is capable of effectively reducing the converging time and improving the positioning efficiency.

In an exemplary embodiment, the code data and the carrier-phase data to be used for smoothing process in the adaptive carrier smoothing processing module 146 are firstly processed by the BSSD mechanism. In other words, the BSSD mechanism in the step S104 is performed first, and the smoothing process in step S106 is performed.

The BSSD mechanism is described first as follows. To multiple satellites, any one of the satellites may be selected as a reference satellite. In an exemplary embodiment, the index k is used to represent the reference satellite, such as the satellite 50a in an example. In the satellites, any one of the effective satellites other than the reference satellite, for example, to be used in the satellite positioning in an example is called as a target satellite. In an exemplary embodiment, the data from at least three target satellites are needed to perform satellite positioning. In the exemplary embodiment, the index 1 is used to indicate the target satellite, 1 is variable and is dependent on the number of satellites actually used in positioning. The target satellites, for example, is one of the satellites 50b, 50c.

In other words, the BSSD is taking one of the satellites as a reference satellite to provide the reference satellite signal and the one or more of the satellites other than the reference satellite are the target satellite for providing the target satellite signal, wherein the reference satellite signal and the target satellite signal are combined to eliminate the common error.

In an exemplary embodiment, the target satellite signal after eliminating the ionospheric error is a first satellite signal ($P_3^l$, $\Phi_3^l$), the reference satellite signal after eliminating the ionospheric error is a second satellite signal ($P_3^k$, $\Phi_3^k$). After the BSSD process, a combined satellite signal is obtained. The combined satellite signal includes the BSSD code data $P_3^{kl}$ and the BSSD carrier-phase data $\Phi_3^{kl}$, as shown in eq. (2):

$$P_3^{kl} = \rho^{kl} + T^{kl} + \Delta\varepsilon_{P3}$$

$$\Phi_3^{kl} = \rho^{kl} + T^{kl} + \lambda N'^{kl} + \Delta\varepsilon_{\Phi3} \quad (2)$$

$\rho^{kl}$: subtracting the geometric distance between the receiver and the satellite k from the geometric distance between the receiver and the satellite l, $T^{kl}$: subtracting the ionospheric delay between the receiver and the satellite k from the ionospheric delay between the receiver and the satellite l, N': subtracting the carrier ambiguity of ionosphere-free combination between the receiver and the satellite k from the carrier ambiguity of ionosphere-free combination between the receiver and the satellite l, λ: wavelength $\Delta\varepsilon_{P3}$: subtracting the unmodeled error of code data between the receiver and the satellite k from the unmodeled error of code data between the receiver and the satellite l, $\Delta\varepsilon_{\Phi3}$: subtracting the unmodeled error of carrier-phase data between the receiver and the satellite k from the unmodeled error of carrier-phase data between the receiver and the satellite l.

In an exemplary embodiment, the error of the last term $\Delta\varepsilon_{P3}$ may be slightly amplified after the BSSD process. Then, the smoothing process may be further performed, such as the step S106 for smoothing process. The BSSD code data and the BSSD carrier-phase data as used in the smoothing process are the data having already been processed by the BSSD process.

The smoothing process mechanism in the adaptive carrier smoothing processing module 146 is described as follows, which is a recursive mechanism and may use the register 130 and the processor 120 for temporarily store process. As shown in FIG. 3, the register 130 records the BSSD carrier-phase data and the BSSD code data which is already smoothed at the $(n-1)^{th}$ time (step S110). In addition, the $n^{th}$ time of smoothing process is accomplished in the adaptive carrier smoothing processing module 146 (step S106). The data at the $n^{th}$ time of the BSSD carrier-phase data and the $n^{th}$ time of the smoothed BSSD code data are updated to the register 130 (step S110) and the data at the $n^{th}$ time of the BSSD carrier-phase data and the smoothed BSSD code data are output to the PPP processing module 148 to perform the subsequent PPP process and obtain the location of the PPP apparatus 200 so as to position the PPP apparatus 200. In FIG. 2, the adaptive carrier smoothing processing module 146 outputs the smoothed code data and the carrier-phase data, which have been performed by the BSSD process and the smoothing process, to the PPP processing module 148, as shown in step S108 to continuously perform the subsequent procedure for the $n^{th}$ PPP process. In an exemplary embodiment, the PPP processing module 148 uses data from multiple target satellites for positioning, wherein the reference satellite for each target satellite may be a same one, or the reference satellite respectively for the corresponding target satellite may be different. The disclosure does not limit the selection of the reference satellite. In an exemplary embodiment, the satellite positioning data include modified code data and modified carrier-phase data. The BSSD carrier-phase data at the $n^{th}$ time is the modified carrier-phase data, the smoothed BSSD code data at the $n^{th}$ time is the modified code data.

In an exemplary embodiment, the smoothing process in the disclosure would be performed on the code data $P_3^{kl}$. In an exemplary embodiment, according to the time point n in the recursive manner, referring to eq. (3), the code data $P_{3,SM}^{kl}(n)$ obtained after the smoothing process at the time point n is a weighted sum of the smoothed code data $P_{3,SM}^{kl}(n-1)$ at the $(n-1)^{th}$ time, the BSSD code data $P_3^{kl}(n)$ at the $n^{th}$ time, and the BSSD carrier-phase data $\Phi_3^{kl}$. The weighted parameters are "a" and "(1-a)", as shown in eq. (3):

$$P_{3,SM}^{kl}(n) = a \cdot P_3^{kl}(n) + (1-a)(P_{3,SM}^{kl}(n-1) + \Phi_3^{kl}(n) + \Phi_3^{kl}(n-1)) \quad (3)$$

where the parameter "a" in the weights "a" and "(1-a)" is changing with time, and a=1/n.

The index n is the time point at the $n^{th}$ time for receiving data. As viewed by time, it is the time point counting from the starting time through n intervals. The subscript "SM" represents the result after the smoothing process. The first term in eq. (3) is the product of the parameter "a" and the BSSD code data $P_3^{kl}(n)$ at the current time point n. The second term includes the product of $P_{3,SM}^{kl}(n-1)+\Phi_3^{kl}(n)+\Phi_3^{kl}(n-1)$ and (1-a). The first term and the second term are summed to obtain the smoothed code data $P_{3,SM}^{kl}(n)$. When the measuring time is increased, the value of n is increased. Therefore, the effect of the second term "$(1-a) \cdot ((P_{3,SM}^{kl}(n-1)+\Phi_3^{kl}(n)+\Phi_3^{kl}(n-1))$" of the smoothed code data $P_{3,SM}^{kl}(n)$ is increased. Further, the superscript "kl" indicates that the BSSD process between the reference satellite k and the target satellite l is complete.

Further, the step S106 is a recursive manner, the first time of smoothing process may be inputted with a proper initial value, such as $p_{3,SM}^{kl}(1) = p_3^{kl}(1)$.

Figure 4:
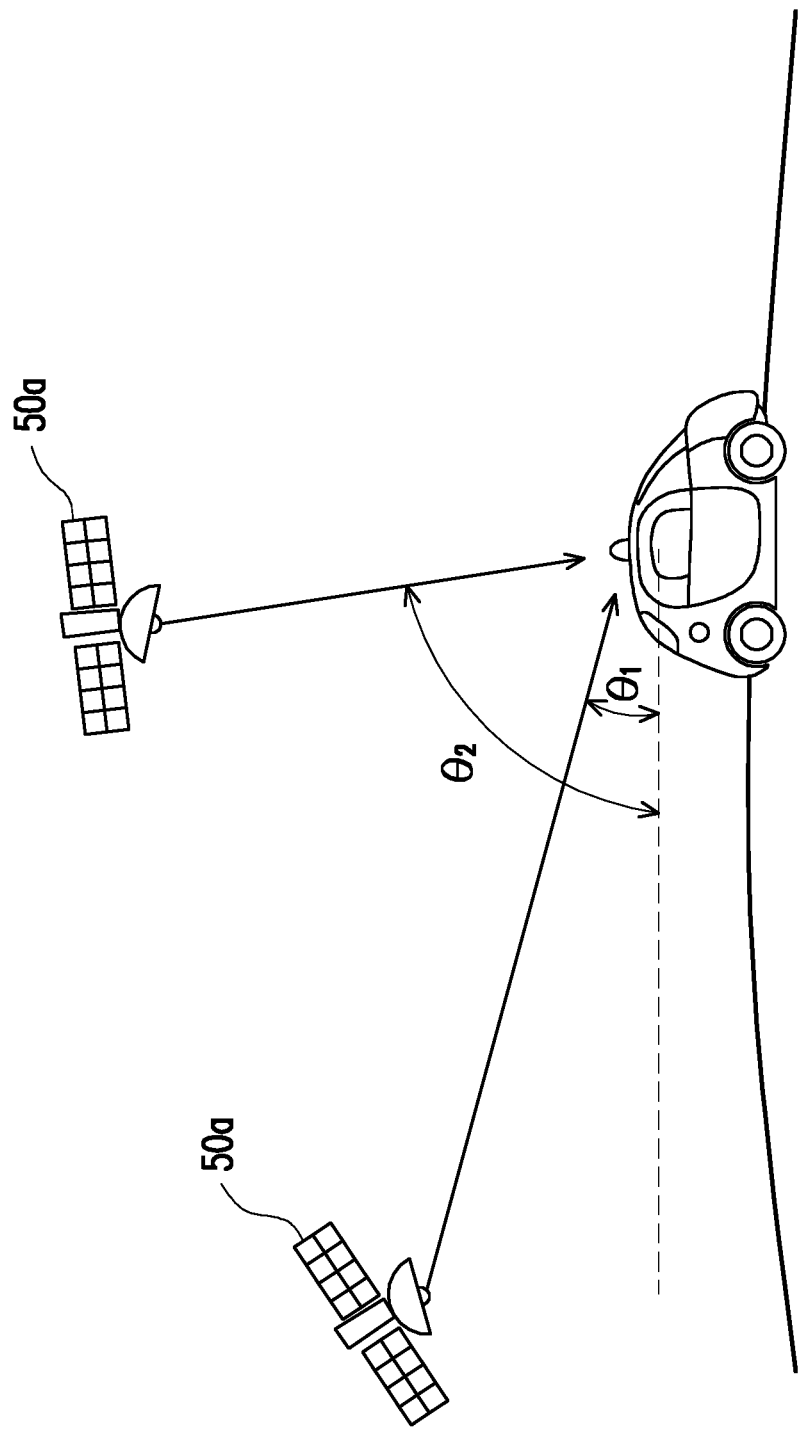
FIG. 4 is a drawing, schematically illustrating a smoothing mechanism in the precise point positioning method with elevation angle, according to an exemplary embodiment of disclosure.

FIG. 4 is a drawing, schematically illustrating a smoothing mechanism in the precise point positioning method with elevation angle, according to an exemplary embodiment of disclosure. Referring to FIG. 4, in an exemplary embodiment, when the satellite elevation angle $\theta_2$ is larger, the satellite is more approaching to the right above direction of the receiver. The satellite signal at this moment may have better quality. On the contrary, when the satellite elevation angle $\theta_1$ is smaller, the satellite is more approaching to a horizontal direction of the receiver. The quality of the satellite signal may be relatively poor.

Due to the factor of the satellite elevation angle $\theta$, the smoothing process may be added with the effect of the satellite elevation angle, to correct the code data with satellite elevation angle, as shown in eq. (4), in which the parameter "a" is then modified as:

$$a = \left(1 - \frac{\theta}{90}\right)\frac{1}{n} \quad (4)$$

Thus, referring to eq. (3) and eq. (4), when the satellite elevation angle $\theta$ is larger such as closing to 90 degrees, the parameter "a" is approaching to zero, and the weight of the second term "$(1-a)\cdot(P_{3,SM}^{kl}(n+1)+\Phi_3^{kl}(n)+\Phi_3^{kl}(n-1))$" in eq. (3) is larger. Therefore, the smoothing speed may be increased. On the contrary, when the satellite elevation angle $\theta$ is smaller such as closing to 0 degree, the weight of the second term in eq. (3) is smaller. Therefore, the smoothing speed would be slowed down and would be the same or similar to the smoothing speed without applying the satellite elevation angle $\theta$.

In an exemplary embodiment, as considering the smoothing effect due to the satellite elevation angle $\theta$, it may be applied to the data without involving the BSSD process. In other words, the step S104 may be skipped. As to the current target satellite with the index l in an example, the eq. (3) may be change to eq. (5):

$$P_{3,SM}^l(n) = a \cdot P_3^l(n) + (1-a)(P_{3,SM}^l(n-1) + \Phi_3^l(n) + \Phi_3^l(n-1)) \quad (5)$$

$$a = \left(1 - \frac{\theta}{90}\right)\frac{1}{n}$$

As to the foregoing descriptions, the disclosure at least has features as follows.

In an exemplary embodiment, the disclosure provides a precise point positioning method, performed by a user equipment, including obtaining a first satellite signal of a target satellite and a second satellite signal of a reference satellite. The first satellite signal and the second satellite signal are combined to eliminate a signal error and obtain a combined satellite signal. A smoothing process is performed on a code data of the combined satellite signal, to obtain a satellite positioning data for positioning process. The satellite positioning data includes modified code data and modified carrier-phase data.

In an exemplary embodiment, the disclosure provides a precise point positioning apparatus, including a processor and a register, configured to perform operations. The operation includes obtaining a first satellite signal of a target satellite and a second satellite signal of a reference satellite. The first satellite signal and the second satellite signal are combined to eliminate a signal error and obtain a combined satellite signal. A smoothing process is performed on a code data of the combined satellite signal, to obtain a satellite positioning data for a positioning process, the satellite positioning data includes a modified code data and a modified carrier-phase data.

In an exemplary embodiment, as to the precise point positioning method and apparatus, the step or operation of combining the first satellite signal and the second satellite signal to eliminate the signal error and obtain the combined satellite signal includes: eliminating a first ionospheric error of the first satellite signal; and eliminating a second ionospheric error of the second satellite signal.

In an exemplary embodiment, as to the precise point positioning method and apparatus, the step or operation of combining the first satellite signal and the second satellite signal to eliminate the signal error and obtain the combined satellite signal further includes using the first satellite signal and the second satellite signal to perform a between satellite single difference (BSSD) process to eliminate a common error.

In an exemplary embodiment, as to the precise point positioning method and apparatus, in the BSSD process, one of a plurality of satellites is served as the reference satellite, the reference satellite provides the second satellite signal, one of the satellites other than the reference satellite is the target satellite, the target satellite provides the first satellite signal.

In an exemplary embodiment, as to the precise point positioning method and apparatus, the smoothing process includes taking a code data of the combined satellite signal at current recursion as a first term, taking a summation of a smoothed code data of the combined satellite signal at previous recursion, a carrier-phase data at current recursion and a carrier-phase data at previous recursion as a second term, summing the first term and the second term respectively with weights by a parameter "a" and a parameter "(1-a)", and obtaining a smoothed satellite positioning data at current recursion.

In an exemplary embodiment, as to the precise point positioning method and apparatus, the parameter "a" includes a satellite elevation angle of a satellite with respect to the user equipment, wherein the parameter "a" decreases as the satellite elevation angle increases.

In an exemplary embodiment, as to the precise point positioning method and apparatus, the parameter "a" is 1/n, wherein the first satellite signal and the second satellite signal are received once at every one interval, wherein the n is the $n^{th}$ time to receive the first satellite signal and the second satellite signal, n is positive integer.

In an exemplary embodiment, as to the precise point positioning method and apparatus, the parameter "a" is $(1-\theta/90)/n$, the parameter $\theta$ is the satellite elevation angle, wherein the first satellite signal and the second satellite signal are received once at every one interval, wherein the parameter n is the $n^{th}$ time to receive the first satellite signal and the second satellite signal, n is positive integer.

In an exemplary embodiment, as to the precise point positioning method and apparatus, each of the first satellite signal and the second satellite signal of the user equipment includes a preliminary error correction data as received from a reference station, wherein the reference station respectively receives radio signals of the reference satellite and the target satellite and produces the preliminary error correction data.

In an exemplary embodiment, as to the precise point positioning method and apparatus, each of the first satellite signal and the second satellite signal includes a code data and a carrier-phase data.

In an exemplary embodiment, the disclosure also provides a precise point positioning method, performed by a user equipment. The method includes receiving a satellite signal of a target satellite once at every one interval, the satellite signal having been processed by an error correction, wherein a current receiving stage is at an $n^{th}$ time, n is positive integer, wherein satellite positioning signal includes a code data and a carrier-phase data. A smoothing process is performed on the code data at the $n^{th}$ time to obtain a smoothed code data at the $n^{th}$ time. The smoothing process is performed at the $n^{th}$ time of recursion, including taking the code data at the $n^{th}$ time at the $n^{th}$ time as a first term, taking a summation of a smoothed code data at the $(n-1)^{th}$ time, a carrier-phase data at the $n^{th}$ time and a carrier-phase data at the $(n-1)^{th}$ time as a second term, summing the first term and the second term respectively with weights by a parameter a' and a parameter (1-a'), and obtaining the smoothed code data at the $n^{th}$ time of recursion. The parameter a' includes a satellite elevation angle of a satellite with respect to the user equipment, the parameter a' decreases as the satellite elevation angle increases.

In an exemplary embodiment, as to the precise point positioning method, the parameter a' includes a multiplying factor of (1-θ/90), the parameter θ is the satellite elevation angle.

In an exemplary embodiment, as to the precise point positioning method, the parameter a' is (1-θ/90)/n changed with time.

In an exemplary embodiment, the disclosure also provides a recording medium, recording a program code. The program code is obtained by a processor of a user equipment to perform the foregoing precise point positioning method.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A precise point positioning method, performed by a user equipment provided on a vehicle, comprising:
    obtaining a first satellite signal of a target satellite and a second satellite signal of a reference satellite;
    combining the first satellite signal and the second satellite signal to eliminate a signal error and obtain a combined satellite signal; and
    performing a smoothing process on a code data of the combined satellite signal, to obtain a satellite positioning data for a positioning process, wherein the satellite positioning data comprises a modified code data and a modified carrier-phase data, wherein a location of the user equipment is displayed based on the satellite positioning data,
    wherein the smoothing process comprises:
        taking a code data of the combined satellite signal at current recursion as a first term, taking a summation of a smoothed code data of the combined satellite signal at previous recursion, a carrier-phase data at current recursion and a carrier-phase data at previous recursion as a second term, summing the first term and the second term respectively with weights by a parameter "a" and a parameter "(1-a)", and obtaining a smoothed satellite positioning data at current recursion,
        wherein the parameter "a" comprises a satellite elevation angle of a satellite with respect to the user equipment, wherein the parameter "a" decreases as the satellite elevation angle increases.

2. The precise point positioning method of claim 1, wherein the step of combining the first satellite signal and the second satellite signal to eliminate the signal error and obtain the combined satellite signal comprises:
    eliminating a first ionospheric error of the first satellite signal; and
    eliminating a second ionospheric error of the second satellite signal.

3. The precise point positioning method of claim 2, wherein the step of combining the first satellite signal and the second satellite signal to eliminate the signal error and obtain the combined satellite signal further comprises:
    using the first satellite signal and the second satellite signal to perform a between satellite single difference (BSSD) process to eliminate a common error.

4. The precise point positioning method of claim 3, wherein in the BSSD process, one of a plurality of satellites is served as the reference satellite, the reference satellite provides the second satellite signal, one of the satellites other than the reference satellite is the target satellite, the target satellite provides the first satellite signal.

5. The precise point positioning method of claim 1, wherein the parameter "a" is (1-θ/90)/n, the parameter θ is the satellite elevation angle, wherein the first satellite signal and the second satellite signal are received once at every one interval, wherein the parameter n is an $n^{th}$ time to receive the first satellite signal and the second satellite signal, n is positive integer.

6. The precise point positioning method of claim 1, wherein each of the first satellite signal and the second satellite signal of the user equipment comprises a preliminary error correction data received from a reference station, wherein the reference station respectively receives radio signals of the reference satellite and the target satellite and produces the preliminary error correction data.

7. The precise point positioning method of claim 1, wherein each of the first satellite signal and the second satellite signal comprises a code data and a carrier-phase data.

8. A precise point positioning apparatus provided on a vehicle, comprising a processor and a register, configured to perform operations, comprising:
    obtaining a first satellite signal of a target satellite and a second satellite signal of a reference satellite;
    combining the first satellite signal and the second satellite signal to eliminate a signal error and obtain a combined satellite signal; and
    performing a smoothing process on a code data of the combined satellite signal, to obtain a satellite positioning data for a positioning process, wherein the satellite positioning data comprises a modified code data and a modified carrier-phase data, wherein a location of the precise point positioning apparatus is displayed based on the satellite positioning data,
    wherein the smoothing process comprises:
        taking a code data of the combined satellite signal at current recursion as a first term, taking a summation of a smoothed code data of the combined satellite signal at previous recursion, a carrier-phase data at current recursion and a carrier-phase data at previous recursion as a second term, summing the first term and the second term respectively with weights by a parameter "a" and a parameter "(1-a)", and obtaining a smoothed satellite positioning data at current recursion,
        wherein the parameter "a" comprises a satellite elevation angle of a satellite with respect to the precise point positioning apparatus, wherein the parameter "a" decreases as the satellite elevation angle increases.

9. The precise point positioning apparatus of claim 8, wherein the operation of combining the first satellite signal and the second satellite signal to eliminate the signal error and obtain the combined satellite signal comprises:
- eliminating a first ionospheric error of the first satellite signal; and
- eliminating a second ionospheric error of the second satellite signal.

10. The precise point positioning apparatus of claim 9, wherein the operation of combining the first satellite signal and the second satellite signal to eliminate the signal error and obtain the combined satellite signal further comprises:
- using the first satellite signal and the second satellite signal to perform a between satellite single difference (BSSD) process to eliminate a common error.

11. The precise point positioning apparatus of claim 10, wherein in the BSSD process, one of a plurality of satellites is served as the reference satellite, the reference satellite provides the second satellite signal, one of the satellites other than the reference satellite is the target satellite, the target satellite provides the first satellite signal.

12. The precise point positioning apparatus of claim 8, wherein the parameter "a" is $(1-\theta/90)/n$, the parameter $\theta$ is the satellite elevation angle, wherein the first satellite signal and the second satellite signal are received once at every one interval, wherein the parameter n is a $n^{th}$ time to receive the first satellite signal and the second satellite signal, n is positive integer.

13. The precise point positioning apparatus of claim 8, wherein each of the first satellite signal and the second satellite signal of the user equipment comprises a preliminary error correction data as received from a reference station, wherein the reference station respectively receives radio signals of the reference satellite and the target satellite and produces the preliminary error correction data.

14. The precise point positioning apparatus of claim 8, wherein each of the first satellite signal and the second satellite signal comprises a code data and a carrier-phase data.

15. A precise point positioning method, performed by a user equipment provided on a vehicle, comprising:
- receiving a satellite signal of a target satellite once at every one interval, the satellite signal having been processed by an error correction, wherein a current receiving stage is at a $n^{th}$ time, n is positive integer, wherein satellite positioning signal comprises a code data and a carrier-phase data, wherein a location of the user equipment is displayed based on the satellite positioning signal; and
- performing a smoothing process on the code data at the $n^{th}$ time to obtain a smoothed code data at the $n^{th}$ time, the smoothing process is performed at the $n^{th}$ time of recursions, comprising:
  - taking the code data at the $n^{th}$ time at the $n^{th}$ time as a first term, taking a summation of a smoothed code data at the $(n-1)^{th}$ time, a carrier-phase data at the $n^{th}$ time and a carrier-phase data at the $(n-1)^{th}$ time as a second term, summing the first term and the second term with weights by a parameter a' and a parameter (1-a'), and obtaining the smoothed code data at the $n^{th}$ time of the recursions,
  - wherein the parameter a' comprises a satellite elevation angle of a satellite with respect to the user equipment, the parameter a' decreases as the satellite elevation angle increases.

16. The precise point positioning method of claim 15, wherein the parameter a' comprises a multiplying factor of $(1-\theta/90)$, the parameter $\theta$ is the satellite elevation angle.

17. The precise point positioning method of claim 16, wherein the parameter a' is $(1-\theta/90)/n$ changed with time.

18. A recording medium, recording a program code, the program code is obtained by a processor of a user equipment provided on a vehicle to perform the precise point positioning method of claim 1.

* * * * *